United States Patent
Hursey

(10) Patent No.: US 8,886,154 B2
(45) Date of Patent: *Nov. 11, 2014

(54) SYSTEMS AND METHODS FOR PROVIDING EMERGENCY CALLBACK PROCEDURES

(71) Applicant: AT&T Intellectual Property I, LP, Atlanta, GA (US)

(72) Inventor: John Hursey, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,986

(22) Filed: Nov. 27, 2012

(65) Prior Publication Data

US 2013/0084824 A1  Apr. 4, 2013

Related U.S. Application Data

(63) Continuation of application No. 12/473,382, filed on May 28, 2009, now Pat. No. 8,369,822.

(51) Int. Cl.

| | | |
|---|---|---|
| *H04M 11/04* | (2006.01) | |
| *H04M 3/42* | (2006.01) | |
| *H04M 11/00* | (2006.01) | |
| *H04W 76/00* | (2009.01) | |
| *H04W 8/26* | (2009.01) | |
| *H04W 4/22* | (2009.01) | |
| *H04W 76/02* | (2009.01) | |

(52) U.S. Cl.
CPC ............... *H04W 4/22* (2013.01); *H04M 11/04* (2013.01); *H04W 76/007* (2013.01); *H04W 8/26* (2013.01); *H04W 76/028* (2013.01)
USPC .................. 455/404.1; 455/417; 455/408

(58) Field of Classification Search
USPC ........................................... 455/404.1
See application file for complete search history.

(56) References Cited

U.S. PATENT DOCUMENTS

| | | | |
|---|---|---|---|
| 8,244,204 B1* | 8/2012 | Chen et al. .................. 455/404.1 |
| 2006/0199572 A1* | 9/2006 | Chin et al. .................... 455/415 |
| 2007/0060097 A1 | 3/2007 | Edge et al. |
| 2007/0149166 A1 | 6/2007 | Turcotte et al. |
| 2008/0084975 A1* | 4/2008 | Schwartz .................... 379/88.22 |
| 2008/0089486 A1 | 4/2008 | Madour et al. |
| 2008/0310599 A1 | 12/2008 | Purnadi et al. |
| 2009/0042539 A1* | 2/2009 | Jiang et al. ..................... 455/408 |
| 2009/0215437 A1* | 8/2009 | Hou .............................. 455/417 |
| 2009/0253399 A1* | 10/2009 | Snapp ....................... 455/404.1 |
| 2009/0253400 A1* | 10/2009 | Jayanna ..................... 455/404.1 |
| 2010/0128864 A1 | 5/2010 | Yin et al. |

* cited by examiner

*Primary Examiner* — Lester Kincaid
*Assistant Examiner* — Andy Gu
(74) *Attorney, Agent, or Firm* — Hartman & Citrin LLC

(57) ABSTRACT

Enhanced services, such as call restriction, call forwarding, anonymous call rejection, and proprietary services, may interfere with an emergency callback potentially preventing the callback from reaching the intended destination. Systems and methods for processing emergency calls to eliminate emergency callback failure in response to an emergency call being released are provided herein.

18 Claims, 6 Drawing Sheets

SYSTEMS AND METHODS FOR PROVIDING EMERGENCY CALLBACK PROCEDURES

RELATED APPLICATION

This application is a continuation of and claims the benefit of U.S. patent application Ser. No. 12/473,382, filed on May 28, 2009, now a issued U.S. Pat. No. 8,369,822, issued on Feb. 5, 2013, the specification of which is incorporated herein by this reference.

TECHNICAL FIELD

The subject disclosure relates generally to wireless emergency services and, more particularly, to systems and methods for providing emergency callback procedures.

BACKGROUND

When a wireline 911 call is initiated, the call is directed to an assigned local Public Safety Answering Point (PSAP). The PSAP answers the call and receives an inbound telephone number or Automatic Number Identification (ANI) information. This number is used to query an Automatic Location Identification (ALI) database, match it with the corresponding address as a location of the calling party, and forward the location information and inbound telephone number to the assigned PSAP. The PSAP can deliver both the number and the location to the appropriate emergency service (e.g., fire, police and/or ambulance) for dispatch.

The above scenario works well when the 911 call originates from a wireline device (e.g., a wireline phone at a residence) because every wireline number is associated with a unique, static address. For mobile devices, such as mobile phones, however, the location changes as the mobile subscriber travels to different locations. Accordingly, the FCC has mandated the use of a technology known as enhanced 911 (E911) to enable mobile devices to process 911 emergency calls and enable emergency services to determine the location of the calling party.

Prior to 1996, wireless 911 callers would have to access their service providers to get verification of subscription service before the call could be routed to a PSAP. In 1996, the FCC ruled that a 911 call must be routed directly to the PSAP without receiving verification of service from a specific mobile operator. The FCC further mandated that the call must be handled by any available carrier even if the carrier is not the calling party's home carrier. Under the FCC's rules, all mobile phones manufactured for sale in the United States after Feb. 13, 2000 must be able to operate in analog mode and must include this special method for processing 911 calls.

The FCC has proposed a phased rollout of E911. In 1998, Phase I was implemented and required that mobile operators identify the originating phone number and the location of the base station or cell within a 1 mile accuracy. Phase I E911 rules require a 7, 8 or 10 digit number to accompany each 911 call. The number provides a callback number for the PSAP dispatcher to use if the call is disconnected or otherwise compromised.

In 2001, Phase II was implemented and required that each mobile operator in the United States offer handset- or network-based location detection capability so that the calling party's location is determined by the geographic location of the mobile handset within 100 meter accuracy. The FCC refers to this as Automatic Location Identification (ALI). Phase II E911 rules provide a more accurate location for the dispatcher to use.

SUMMARY

The subject disclosure provides systems and methods to eliminate call blockers dynamically to ensure that emergency callbacks can proceed to the emergency calling party without interference. Many intelligent call management services can block incoming calls based upon criteria such as, but not limited to, time of day, day of week, week of month, month of year, minute limits, and the like. These services are often setup by the subscriber via websites, device clients, and interactive voice response (IVR) systems. However, when the calling party is a PSAP emergency responder who is responding to a previous mobile-generated emergency call, these restrictions are undesirable. It is impractical for the subscriber to locate and turn off any features that could block an incoming call before placing an emergency call in an emergency situation. Therefore, the mobile operator can benefit from automatic and reliable methods to eliminate call blocking features when and wherever possible.

The subject disclosure can utilize Integrated Services Digital Network (ISDN) User Part (ISUP) and Customized Applications for Mobile network Enhanced Logic (CAMEL) protocol parameters including, but not limited to, the calling party category (CPC) parameter, to initiate proprietary and manipulated Mobile Application Part (MAP) protocol messages (e.g., SendRoutingInformation (SRI)) between a gateway mobile switching center (GMSC) and a home location register (HLR). When the GMSC receives a CPC of "Emergency Service Call" (E0H), the GMSC can use the CPC to create a special-use SRI message and send the special-use SRI message to the HLR. The HLR can use the various parameters in the SRI to make further decisions regarding how to respond to the GMSC. The HLR can retrieve a valid Mobile Station Roaming Number (MSRN) from the serving visiting location register (VLR) for the subscriber via standard protocols and procedures. The HLR can send an SRI response message without the undesired call block features. The SRI response message can include the MSRN to be used in the final call to the subscriber's device. The call will proceed from the GMSC to the serving MSC (e.g., a visiting MSC) without interference and the subscriber can receive the emergency callback.

According to one aspect of the subject disclosure, a method for emergency call delivery in a communications network can include establishing an emergency call between a mobile device and a PSAP and initiating an emergency callback to the mobile device in response to an unexpected release of the emergency call. The emergency callback is routed to a gateway mobile switching center (GMSC). The method can further include issuing a special-use SendRoutingInformation (SRI) message to a location register. The special-use SRI message can include a protective parameter configured to suppress a call blocking feature. The method can further include executing a ProvideRoutingNumber (PRN) procedure between the location register and a serving mobile switching center (MSC) to retrieve a Mobile Station Roaming Number (MSRN), appending, at the location register, the MSRN to an SRI ACK message and sending the SRI ACK message to the GMSC, and routing the emergency callback to the serving MSC and connecting the emergency callback to the mobile device without interference from the call blocking feature.

In some embodiments, the emergency callback includes a calling party number set to a number for the PSAP and a calling party category (CPC) set to emergency services call (ESC) or other category. In other embodiments, the emergency callback includes a called party number set to a temporary routing number.

In some embodiments, the method can further include transmitting, from the GMSC, a query to an emergency callback platform to request a Mobile Subscriber ISDN Number (MSISDN) that matches the temporary routing number and receiving, at the GMSC, a query response that includes the MSISDN and CPC=ESC.

In some embodiments, the special-use SRI message includes a protective parameter configured to suppress one or more of a call forwarding service, a bar all incoming calls (BAIC) service, an anonymous call rejection (ACRJ) service, and a proprietary service.

According to another aspect of the subject disclosure, a method for operating a GMSC to deliver an emergency callback to an emergency calling party can include processing the emergency callback received from a PSAP in response to an unexpected release of an emergency call and issuing a special-use SRI message to an HLR. The SRI message can include a parameter to suppress a call blocking feature enabled for the emergency calling party. The method can further include processing an SRI response message received from the HLR in response to the SRI message. The SRI response message can include an MSRN. The method can further include routing the emergency callback to a serving MSC based upon the MSRN.

According to another aspect of the subject disclosure, a GMSC for delivering an emergency callback to an emergency calling party can include a processor and a memory, in communication with the processor. The memory can be configured to store instructions that, when executed, perform the steps of the aforementioned method.

According to another aspect of the subject disclosure, a method for handling an emergency callback in an Internet Protocol (IP) multimedia subsystem (IMS) network can include the IMS network receiving an emergency callback at a callback gateway in response to an emergency call being unexpectedly released. The emergency callback can include a CdPN field that is populated with a temporary callback number (TCBNUM) and a CgPN field that is populated with a number for a PSAP that handled the emergency call prior to the call being released. The TCBNUM can be initially received by the PSAP in response to the PSAP sending an emergency services positioning request (ESPOREQ) to a gateway mobile location center (GMLC). The GMLC can match the TCBNUM to a MSISDN of an emergency calling party of the emergency call. The GMLC can maintain the MSISDN/TCBNUM match in its database.

The method can further include the IMS network generating a special session initiation protocol (SIP) invite that is directed toward an emergency callback application server (ECB-AS) in communication or integral to the IMS network. Prior to the above, the ECB-AS can receive a first data update and a second data update from the GMLC. The first data update can include the TCBNUM and the corresponding MSISDN for the emergency calling party. The second data update can include a call termination notice to inform the ECB-AS that the emergency call has been terminated.

In response to receiving the special SIP invite from the IMS network, the ECB-AS can generate a special-use SRI message that is directed to a location register, such as a home location register or home subscriber server. The special-use SRI message can include a parameter to suppress one or more call blocking features enabled for the emergency calling party. The ECB-AS can receive an SRI ACK message from the location message. The SRI ACK message can include a mobile station routing number (MSRN) that was obtained by the location register during a ProvideRoutingNumber (PRN) process executed between the location register and a serving mobile switching center (MSC).

The ECB-AS can further generate an invite message directed to the IMS network. The invite message can include the MSRN in a to field of the invite message and the PSAP number tagged as emergency in from field of the invite message. The IMS network can send a modified emergency callback to the serving MSC to connect the emergency call. The modified emergency callback can include the MSRN, the CgPN, and any CPC data.

DETAILED DESCRIPTION

As required, detailed embodiments of the subject disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the subject disclosure. Therefore, specific structural and functional details disclosed herein are not to be interpreted as limiting, but merely as a basis for the claims and as a representative basis for teaching one skilled in the art to variously employ the subject disclosure.

The emergency call notification and emergency callback procedures described herein are described with reference to wireless network elements of a Global System for Mobile communications (GSM) network and a Universal Mobile Telecommunications System (UMTS) network. Novel network elements for processing emergency callbacks are also described. The subject disclosure is not limited to GSM and UMTS networks. Rather, the subject disclosure is applicable to any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G (third generation), and above (4G and beyond) technologies. Examples of suitable data enabling bearers include General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data enabling bearers.

Figure 1:
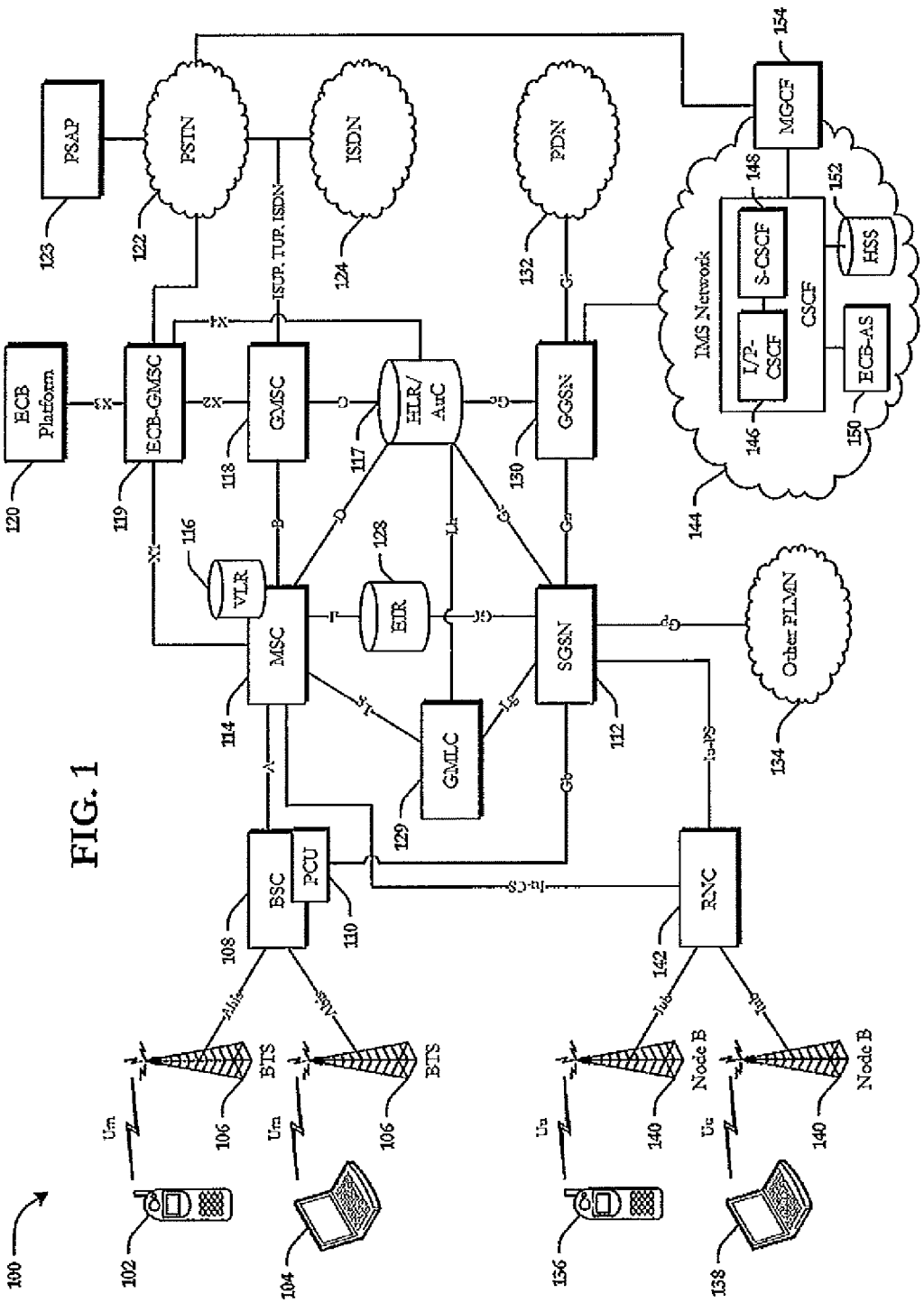
FIG. 1. illustrates an exemplary communications network in which the subject disclosure can be implemented.

The illustrated communications network 100 includes two radio access networks (RAN). A first RAN, illustrated in the upper left hand portion of FIG. 1, is dedicated to GSM-based network access. A second RAN, illustrated in the lower left hand portion of FIG. 1, is dedicated to UMTS-based network access. The subject disclosure is not limited to the illustrated embodiments for GSM and UMTS network access. Other access technologies are contemplated as described above. The first RAN is described immediately below.

The illustrated communications network 100 includes a first mobile station (MS) 102 and a second MS 104 that are each in communication with a base transceiver station (BTS) 106 via the Um radio (air) interface. A BTS 106 is the terminating node for the radio interface in the first RAN. Each BTS 106 can include one or more transceivers and can be responsible for ciphering of the radio interface.

In the illustrated embodiment, the first MS 102 is a mobile phone and the second MS 104 is a portable computer, such as a laptop with an integrated or external, removable GSM access card. Each MS 102, 104 can include mobile equipment, such as, but not limited to, keyboards, screens, touch screens, multi-touch screens, radio transceivers, circuit boards, processors, memory, a subscriber identity module (SIM) that contains subscriber information to enable network access to the wireless telecommunications network 100, and the like.

Each BTS 106 is in communication with a base station controller (BSC) 108 via the Abis interface. The BSC 108 is configured to allocate radio resources to the MS's 102, 104, administer frequencies, and control handovers between BTS's 106 (and others not shown). Although illustrated as a distinct element, the BSC 108 functions can be incorporated in the BTS 106 and the Abis interface can be eliminated.

The BSC 108 can be logically associated with a packet control unit (PCU) 110 when GPRS capabilities are employed. The PCU 110 is configured to support radio related aspects of GPRS when connected to a GSM network. The PCU 110 is in communication with a serving GPRS support node (SGSN) 112 via the Gb interface. The SGSN 112 records and tracks the location of each mobile device (e.g., MS's 102, 104) in the wireless telecommunications network 100. The SGSN 112 also provides security functions and access control functions.

The BSC 108 is in communication with a mobile switching center (MSC) 114 via an A interface. The MSC 114 is configured to function as a telecommunications switch and is in communication with location databases, such as a visiting location register (VLR) 116 and a home location register (HLR) 117. The VLR 116 can be logically associated with the MSC 114 as illustrated or can be a separate network element. The VLR 116 is a database configured to store all subscriber data that is required for call processing and mobility management for mobile subscribers that are currently located in an area controlled by the VLR 116. The HLR 117 is in communication with the MSC 114 and VLR 116 via the D interface. The HLR 117 is a database configured to provide routing information for mobile terminated (MT) calls and various messaging communications. The HLR 117 is also configured to maintain subscriber data that is distributed to the relevant VLR (e.g., the VLR 116) or the SGSN 112 through the attach process and mobility management procedures, such as location area and routing area updates. The HLR 117 can be logically associated with an authentication center (AuC) as illustrated. The AuC is configured to authenticate each SIM card that attempts to connect to the wireless telecommunications network 100, for example, when a mobile device is powered on. Once authenticated, the HLR 117 is allowed to manage the SIM and services provided to the MS 102, 104. The AuC can generate an encryption key that is used to encrypt all wireless communications between the MS 102, 104 and the communications network 100.

The MSC 114 is also in communication with a gateway MSC (GMSC) 118 via the B interface. The MSC 114 is also in communication with an emergency callback (ECB) gateway MSC (ECB-GMSC) 119. The ECB-GMSC 119 can be configured to handle only emergency callbacks. Alternatively, the ECB-GMSC 119 can be configured to perform functions of the GMSC 118 and/or MSC 114 in addition to handling emergency callbacks. It is contemplated that the ECB-GMSC 119 can exist as a separate network element as illustrated, or the functionality thereof can be included in the MSC 114 and/or the GMSC 118.

The ECB-GMSC 119 can communicate with the MSC 114 via an exemplary X1 interface. The X1 interface can be, for example, a B interface, a proprietary interface, or other interface. The ECB-GMSC 119 can communicate with the GMSC 118 via an exemplary X2 interface. The X2 interface can be, for example, a B interface, a proprietary interface, or other interface. The ECB-GMSC 119 can communicate with an ECB system 120 via an exemplary X3 interface. The X1 interface can be, for example, a proprietary interface, or other standard interface. The ECB-GMSC 119 can communicate with the HLR 117 via an exemplary X4 interface. The X4 interface can be, for example, a C interface, a proprietary interface, or other interface.

The GMSC 118 is configured to provide an edge function within a public land mobile network (PLMN). The GMSC 118 terminates signaling and traffic from the public switched telephone network (PSTN) 122 and integrated service digital network (ISDN) 124, and converts the signaling and traffic to protocols employed by the mobile network. The GMSC 118 is in communication with the HLR/AuC 117 via the C interface to obtain touting information for mobile-terminated calls originating from fixed network devices, such as fixed telephones that are in communication with the mobile network via the PSTN 122, for example. The PSTN 122 can be in communication with one or more PSAPs 123. The PSAP 123 can be controlled by a federal entity, a state entity, a county entity, or a city entity, and is responsible for answering emergency calls and dispatching emergency assistance from police, fire, ambulance services, and/or other emergency services.

In some embodiments, the ECB-GMSC 119 is used in addition to the GMSC 118. In other embodiments, the ECB-GMSC 119 is configured to function like the GMSC 118 as described above. In either case, the ECB-GMSC 119 can be configured to terminate signaling and traffic from the PSTN 122 and the ISDN 124, and convert the signaling and traffic to protocols employed by the mobile network. The ECB-GMSC 119 can be in communication with the HLR 117 to obtain routing information. In addition, the ECB-GMSC 119 can communicate with the HLR 117 using ISUP and CAMEL protocol parameters (e.g., a CPC parameter) to initiate proprietary and manipulated MAP protocol messages including, but not limited to, a special-use SRI message to eliminate or disable enhanced service features that may interfere with emergency callback procedures.

An enhanced service, as used herein, can refer to a service that can, during an emergency callback, interfere or prevent completion of an emergency callback to the subscriber should the subscriber be disconnected from the PSAP 123. Examples of enhanced services include, but are not limited to, call forwarding services (conditional or unconditional), bar all incoming calls (BAIC) within the home PLMN (HPLMN), BAIC outside the HPLMN, anonymous call rejection (ACRJ), and any proprietary services offered by the mobile operator and/or a vendor that could potentially interfere or prevent completion of an emergency callback. It is contemplated that a call restriction database (not shown) can be in communication with the Enhanced service databases similar to the call restriction database 122 can be maintained for each enhanced service type.

The ECB-GMSC 120 is illustrated as being in communication with the ECB platform 120. The ECB platform 120 can be an intelligent network (IN) element, such as a service control point (SCP) to implement service control functions in accordance with features of the emergency callback procedures described herein. Intelligent networks provide intelligent services that are separated from the network switching functions performed by the MSC 114, the GMSC 118, and/or the ECB-GMSC 119, for example. In an alternative embodiment, the functions provided by the ECB platform 120 can be implemented within the MSC 110, the GMSC 114, and/or the ECB-GMSC 119.

The ECB platform 120 can be configured to store subscriber information for services that may potentially affect emergency callback procedures. The ECB platform 120 can include one or more processors and one or more memory modules to store the subscriber information. Alternatively, the ECB platform 120 can be in communication with one or more networked databases, such as a call restriction database (not shown) to retrieve the subscriber information as needed. The call restriction database can periodically update the ECB platform 120 with a call restriction status for each subscriber. If further information with regard to the specifics of a call restriction placed on a subscriber's account is required, the ECB platform 120 can query the call restriction database to acquire the information. The call restriction database can act as a backup of the subscriber information stored within the ECB platform 120 and/or the HLR 117, for example.

The ECB platform 120 can be configured to use the subscriber information to determine if a call restriction or other enhanced service is associated with a subscriber's account. If a call restriction or other enhanced service is present, the ECB platform 120 can eliminate or disable the service temporarily in accordance with override procedures defined by the mobile operator, a government body (e.g., FCC), or a vendor, for example. Alternatively, the ECB platform 120 can send instructions to the call restriction database or other enhanced service database to deactivate the service in accordance with override procedures defused by the mobile operator, a government body (e.g., FCC), or a vendor.

The MSC 114 is also in communication with an equipment identity register (EIR) 128 via an F interface. The EIR 128 is a database that can be configured to identify subscriber devices that are permitted to access the wireless telecommunications network 100. An International Mobile Equipment Identity (IMEI) is a unique identifier that is allocated to each mobile device and can be used to identify subscriber devices in the EIR 128. The IMEI includes a type approval code, a final assembly code, a serial number, and a spare digit. An IMEI is typically placed in the EIR 128 once its operation has been certified for the infrastructure in a laboratory or validation facility.

The SGSN 112 and the MSC 114 are also in communication with a gateway mobile location center (GMLC) 129 via an Lg interface. The GMLC 129 can communicate with the HLR/AUc 117 via an Lb interface to acquire routing information.

The EIR 128 and the HLR/AuC 117 are each in communication with the SGSN 112 via the Gf interface and the Gf interface, respectively. The SGSN 112, in turn, is in communication with a gateway GPRS support node (GGSN) 130 via the Gn interface. The GGSN 130 is configured to provide an edge routing function within a GPRS network to external packet data networks (PDN) 132, such as the Internet and one or more intranets, for example. The GGSN 130 is in communication with the PDN 132 via the Gi interface. The GGSN 130 can include firewall and filtering functionality. The HLR/AuC 117 can be in communication with the GGSN 130 via the Gc interface.

The SGSN 112 is also in communication with another PLMN 134 via an external GGSN (not shown). The external GGSN 130 provides access to the other PLMN 134 that can be, for example, a wireless telecommunications network operated by another wireless service provider or the same wireless service provider.

The second RAN, illustrated in the lower left hand portion of FIG. 1, is dedicated to UMTS-based network access and is now described. The illustrated wireless telecommunications network 100 also includes a first user equipment (UE) 136 and a second UE 138 that are each in communication with a Node B 140 via the Uu radio (air) interface. A Node B 140 is the terminating node for the radio interface in the second RAN. Each Node B 140 can include one or more transceivers for transmission and reception of data across the radio interface. Each Node B 140 is configured to apply the codes to describe channels in a CDMA-based UMTS network. Generally, the Node B 140 performs similar functions for the UMTS network that the BTS 106 performs for the GSM network.

In the illustrated embodiment, the first UE 136 is a mobile phone and the second UE 138 is a portable computer, such as a laptop with an integrated or external, removable UMTS card. Each UE 136, 138 can include mobile equipment, such as keyboards, screens, touch screens, multi-touch screens, radio transceivers, circuit boards, processors, a SIM/universal SIM (USIM) that contains subscriber information to enable network access to the wireless telecommunications network 100, and the like. Generally, the UE's 136, 138 perform similar functions for the UMTS network that the MS's 102, 104 perform for the GSM network.

Each Node B 140 is in communication with a radio network controller (RNC) 142 via the Iub interface. The RNC 142 is configured to allocate radio resources to the UE's 136, 138, administer frequencies, and control handovers between Node B's 140 (and others not shown). Although illustrated as a distinct element, the RNC 142 functions can be located with the Node B's 140. In this embodiment, the Iub interface is eliminated. Generally, the RNC 142 performs similar functions for the UMTS network that the BSC 108 performs for the GSM network.

The RNC 142 is in communication with the MSC 114 via an Iu-CS interface. The RNC 142 is also in communication with the SGSN 112 via an Iu-PS interface. The other network elements perform the same functions for the UMTS network as described above for the GSM network.

The communications network 100 also includes an IP Multimedia Subsystem (IMS) network 144. The IMS network 144 includes Call State Control Functions (CSCFs), such as, a proxy CSCF (P-CSCF), an interrogating CSCF (I-CSCF), and a serving CSCF (S-CSCF). A P-CSCF is the first contact point in the IMS network 144 for a UE and routes incoming communications to the I-CSCF. The I-CSCF determines the S-CSCF serving the communication and routes the communication to the appropriate S-CSCF, which performs registration, session control, and application interface functions. The P-CSCF and the I-CSCF are illustrated as a combined I/P-CSCF 146 and the S-CSCF 148 is illustrated as a stand-alone element. Other CSCF configurations are contemplated.

The illustrated IMS network 144 also includes an emergency callback (ECB) application server (AS) 150, a home subscriber server (HSS) 152, and a media gateway control function (MGCF) 154. The ECB-AS 150 supports emergency callback features in the IMS network 144. The HSS 152 supports HLR functions, access functions, authorization functions, accounting functions, and stores subscriber data for the IMS network 144. The MGCF 154 interfaces with the PSTN 122 and supports protocol conversion functions.

Figure 2:
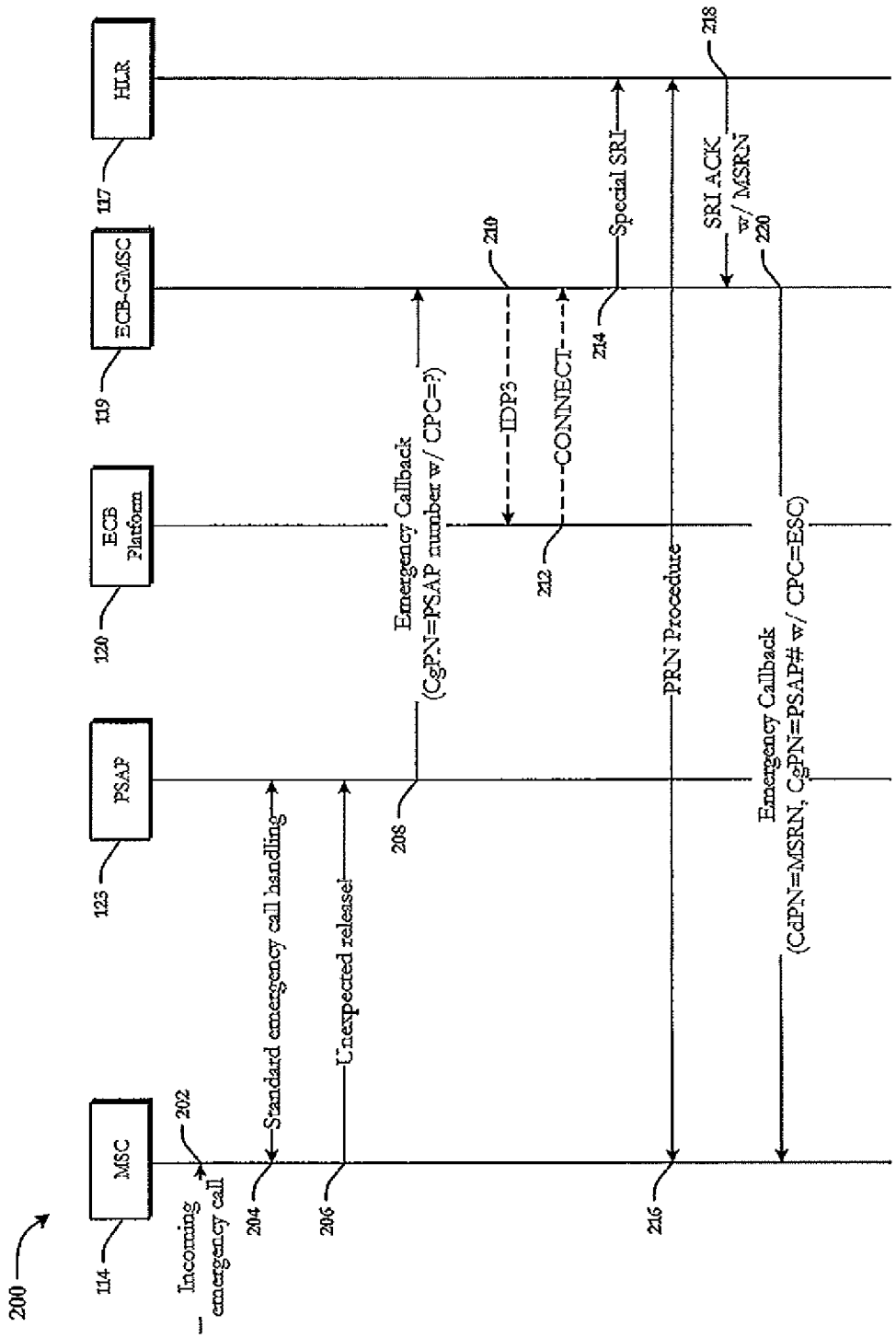
FIG. 2 illustrates an exemplary message flow diagram of an emergency callback procedure, according to an embodiment of the subject disclosure.

Referring now to FIG. 2, an exemplary message flow diagram illustrates an emergency callback procedure 200, according to an embodiment of the subject disclosure. The illustrated message flow diagram includes the MSC 114, the PSAP 123, the ECB platform 120, the ECB-GMSC 119, and the HLR 117. The MSC 114 is the serving MSC in the illustrated embodiment. In alternative embodiments, the serving MSC is a VMSC (not shown), for example.

The message flow begins at the MSC 114 when an emergency call is received, at step 202. The MSC 114 communicates with the PSAP 123 to connect the emergency call according to standard emergency call handling procedures, at step 204. Standard emergency call handling procedures can include, for example, call routing, locating the calling party device, and otherwise establishing the call. At step 206, the call is unexpectedly released for any reason, for example, the call is dropped or otherwise compromised, thereby triggering an emergency callback procedure beginning with step 208.

At step 208, the PSAP 123 initiates an emergency callback procedure to the emergency calling party. In the illustrated embodiment, the PSAP 123 sets the calling party number (CgPN) to the PSAP digits and the calling party category (CPC) to "Emergency Service Call" (ESC) or other category. Alternatively, the PSAP 123 can set the CgPN to the subscriber's Mobile Subscriber ISDN Number (MSISDN) or a temporary routing number. The PSAP 123 can route the emergency callback to the appropriate GMSC which, in the illustrated embodiment, is the ECB-GMSC 119, although this is not necessarily the case.

If a temporary routing number is used, the PSAP 123 routes the call to the ECB-GMSC 119 including the temporary routing number as the CgPN. The ECB-GMSC 119 recognizes the temporary routing number and launches an initial detection point (IDP) message or equivalent message towards the ECB platform 120, at step 210. The ECB platform 120 can recognize the temporary routing number and find the matching MSISDN. At step 212, the ECB platform 120 can issue a CONNECT message or equivalent message including the MSISDN and the PSAP calling number with the CPC set to ESC.

At step 214, the ECB-GMSC 119 creates a special-use SRI message. The SRI message can be created in response to the initial address message (IAM) message including the CPC set to ESC or the CONNECT message (step 212) for the temporary routing number embodiment. The SRI message can include protective parameters to eliminate, disable or suppress call blocking procedures, such as, but not limited to, Terminating-CAMEL Subscription Information (T-CSI) suppression, a call restriction service, a call forwarding service, a bar all incoming calls (BAIC) service, an anonymous call rejection service, or a proprietary service provided by a mobile operator or vendor, for example. A call forwarding service can include, but is not limited to, call forwarding unconditional (CFU), call forwarding on mobile subscriber not reachable (CFNRc), call forwarding on no reply (CFNRy), and the like.

The ECB-GMSC 119 can use a calling party's CPC to determine how an SRI message is populated. The ECB-GMSC 119 can receive that information from at least the incoming ISUP IAM or CAMEL CONNECT messages. When the ECB-GMSC 119 receives the CPC, it will analyze the value using proprietary screening translations. If the CPC value is set to ESC, then translations will utilize a special pre-defined SRI profile to alter normal SRI message parameter settings sent forward to the HLR 117. Some example parameters include, but are not limited to, "Suppress-T-CSI" and "SuppressionOfAnnouncement" parameters.

The HLR 117 can analyze all parameters received in an SRI message and use the parameters in accordance with standard and proprietary policies and functions. The HLR 117 can receive the special SRI message and record all of its special parameters. The HLR 117 can act on the received data records in a pre-defined manner. An object of the subject disclosure is to bypass all interfering features (e.g., TCSI, CFU, BAIC, and like), when possible, and directly request an MSRN from the serving VLR.

At step 216, normal ProvideRoutingNumber (PRN) procedures are executed. The PRN procedures can begin when the HLR 117 sends a MAP PRN message to the MSC 114. The MAP PRN message can trigger the MSC 114 to forward an MSRN to the HLR 117. At step 218, the HLR 117 appends the MSRN to an SRI ACK message and sends the SRI ACK message to the ECB-GMSC 119 for processing. At step 220, the ECB-GMSC 119 routes the call to the MSC 114 including the called party number (CdPN) set to the MSRN, and the CgPN set to the PSAP number with the CPC value set to ESC. The emergency call can be connected to the mobile device without interference from enhanced services.

Figure 3:
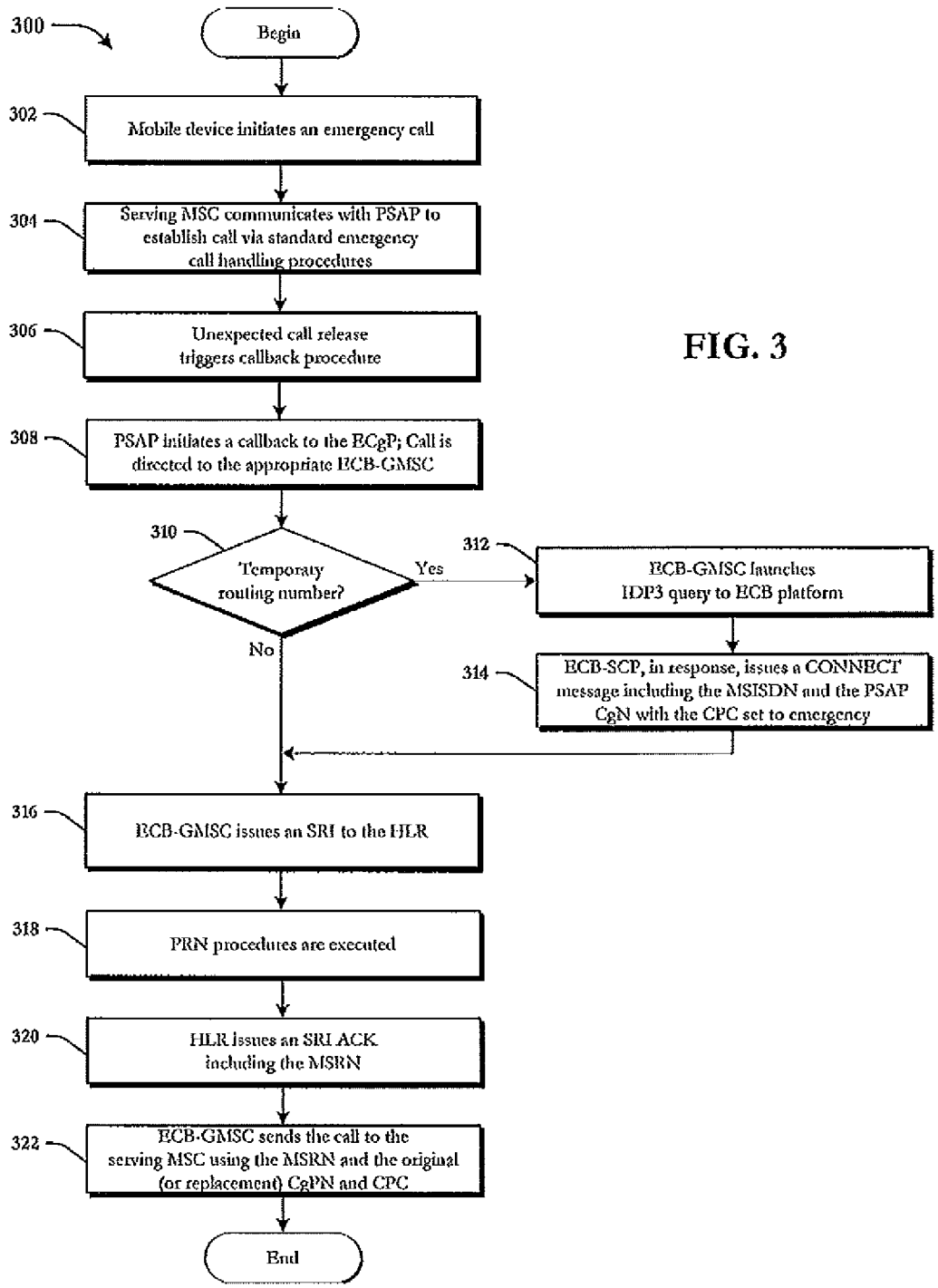
FIG. 3 illustrates a method for providing an emergency callback procedure, according to an embodiment of the subject disclosure.

Referring now to FIG. 3, a method 300 for providing an emergency callback procedure is illustrated, according to an exemplary embodiment of the subject disclosure. It should be understood that the steps of the method 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. Some or all steps of this process, and/or substantially equivalent steps can be performed by execution of computer-readable instructions stored or included on a computer readable medium.

The method 300 begins and flow proceeds to block 302, wherein a mobile device (e.g., MD 102, MD 104, UE 138, UE 140) initiates an emergency call. At block 304, the serving MSC, for example, the MSC 114, another MSC or VMSC, communicates with the PSAP 123 to establish a call via standard emergency call handling procedures for E911, for example. The call is unexpectedly released at block 306, for example, due to the call being dropped or otherwise compromised. The call being released triggers an emergency callback procedure. For example, the call could be dropped due to low signal, failed handoff, failed switching, power loss, or for any other reason. In response to the unexpected release, at block 308, the PSAP 123 initiates an emergency callback to the emergency calling patty (ECgP) and the call is directed to the appropriate ECB-GMSC 119.

In some embodiments, the emergency callback is addressed to the ECgP via the subscriber's MSISDN. In an alternative embodiment, the emergency callback is addressed to a temporary routing number. Accordingly, it is determined, at block 310, whether the emergency callback was addressed to the MSISDN or a temporary routing number.

If a temporary number was used, flow proceeds to block 312, wherein the ECB-GMSC 119 launches an IDP3 query or equivalent query to the ECB-platform 120. At block 314, the ECB-platform 120 finds the MSISDN that matches the temporary routing number, and issues a CONNECT message that includes the MSISDN and the PSAP CgN with the CPC value set to ESC. Flow can then proceed to block 316. Otherwise, if a temporary number was not used, flow proceeds directly to block 316. At block 316, the ECB-GMSC 119 issues a special-use SRI to the HLR 117. The SRI message can be created in response to the IAM message including the CPC value set to ESC or the CONNECT message sent at block 314. The SRI message can include protective parameters to eliminate, disable or suppress call blocking procedures, such as, but not limited to, T-CSI suppression, a call restriction service, a call forwarding service, a BAIC service, an anonymous call rejection service, or a proprietary service provided by a mobile operator or vendor, for example. A call forwarding service can include, but is not limited to, CFU, CFNRc, CFNRy, and the like.

At block 318, normal PRN procedures are executed. The PRN procedures can begin when the HLR 117 sends a MAP PRN message to the MSC 114. The MAP PRN message can trigger the MSC 114 to forward an MSRN to the HLR 117. At block 320, the HLR 117 appends the MSRN to an SRI ACK message and sends the SRI ACK message to the ECB-GMSC 119 for processing. At block 322, the ECB-GMSC 119 routes the call to the MSC 114 including the CdPN set to the MSRN, and the CgPN set to the PSAP number with the CPC value set to ESC. The emergency call can be connected to the mobile device without interference from enhanced services. The method 300 can end.

Figure 4:
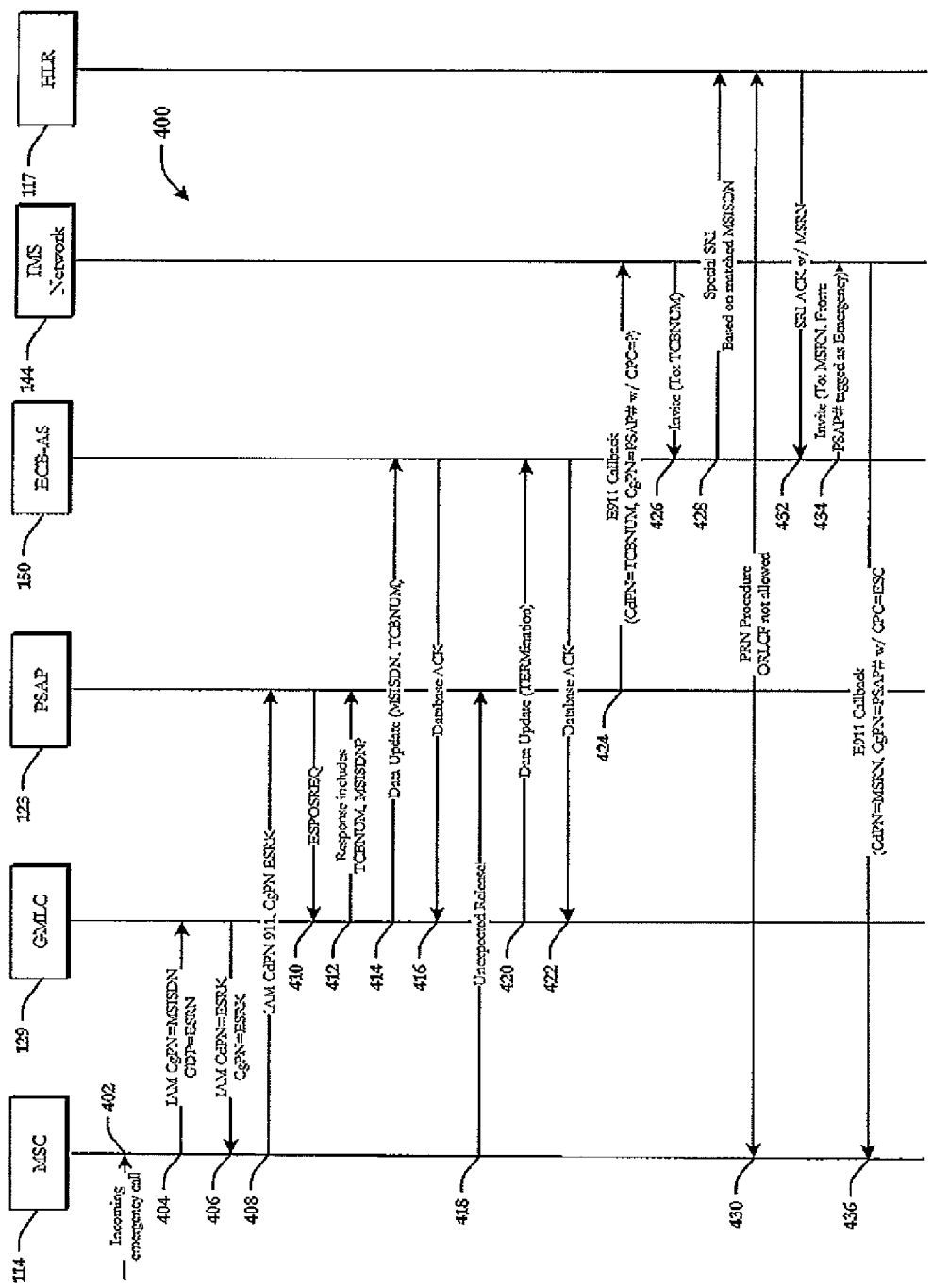
FIG. 4 illustrates an exemplary message flow diagram of an emergency callback procedure, according to another embodiment of the subject disclosure.

Referring now to FIG. 4, a message flow diagram illustrates an emergency callback procedure 400, according to another exemplary embodiment of the subject disclosure. The illustrated message flow diagram includes the MSC 114, the GMLC 129, the PSAP 123, the ECB-AS 150, the IMS network 144, and the HLR 117. The illustrated embodiment makes available a solution to handle the problem of PSAP callback blocking across multiple operators in the context of inter-operator roaming, for example.

The emergency callback procedure 400 begins at step 402 when a mobile device such as, for example, MSs 102, 104 and UEs 136, 138 initiates an emergency services call (e.g., by dialing 9-1-1). At step 404, the MSC 114 detects the emergency call and launches an IAM message towards the GMLC 129 based upon the cell ID to which the mobile device is connected. It is noted that the mobile device can be any valid mobile device, a mobile device with disconnected service (i.e., only available for emergency calls), or a mobile device without a SIM card. The CgPN field of the IAM message can be populated with the MSISDN of the subscriber, the CdPN field can be populated with 9-1-1, another emergency number, or a translated emergency number, and the generic digit parameter (GDP) can be a ten digit location number from which the call was initiated, for example, the emergency service routing number (ESRN). The voice channel can be looped back in the MSC 114.

The GMLC 129 can determine, based upon the location area (LA) and the cell ID, the capabilities of the PSAP that serves a particular location. At step 406, the GMLC 129 can issue an IAM back to the MSC 114. This IAM can include a CgPN and CdPN each set to the emergency services routing key (ESRK) to uniquely identify the emergency call and for use in routing the call through the network 100. The ESRK can also be used to retrieve automatic location identification (ALI) data. At step 408, the MSC 114 can route the emergency call to the PSAP 123, as identified by the ESRK through an incumbent local exchange carrier (ILEC) selective router (not shown). This IAM can include a CdPN field populated with the emergency number (e.g., 9-1-1) and the CgPN field populated with the ESRK. If the PSAP 123 supports centralized automatic message accounting (CAMA), then a temporary ESRK (T-ESRK) can be assigned for routing. The T-ESRK can be a unique value assigned per cell site. If the PSAP 123 supports multi-frequency (ME) or ISUP, then the emergency services routing digit (ESRD) and the callback number can be returned for routing.

After the emergency call is received at the PSAP 123, the PSAP 123 can interrogate the GMLC 129 for location and callback information using an emergency services positioning request (ESPOSREQ) message, as illustrated at step 410. At step 412, the GMLC 129 can respond to the ESPOSREQ message by sending a message that includes a temporary callback number (TCBNUM) instead of the subscriber's MSISDN.

In some embodiments, a calling party without service or without an assigned MSISDN may not be able to obtain a TCBNUM, such as in some implementations of 2G and 3G technologies, although this may in fact be dependent upon the operator. Moreover, in these embodiments, a roaming subscriber may not be able to obtain a TCBNUM. Other technologies, such as 4G technologies (e.g. long term evolution), may support assigning TCBNUMs for roaming subscribers and/or calling parties without service or without an assigned MSISDN. This can be assessed by the operator on a case by case basis and based upon the features supported by a given technology.

The GMLC 129 can maintain the correlation between the subscriber's actual MSISDN and the TCBNUM in its database for any period of time, for example, as defined by the network operator. Additionally, the GMLC 129 can discriminate any MSISDN digit or the lack thereof in this decision making process. By way of example, the GMLC 129 may not be able to send the TCBNUM if there is no CgPN available, such as if the initiating mobile device does not have a SIM card inserted or the mobile device is deregistered with no MSISDN (or equivalent number) available. It should be understood that the actual MSISDN can be sent in this response to the PSAP 123 for use in backup routing and for other purposes, such as tracking, for example.

The response described immediately above can trigger a data update from the GMLC 129 to the ECB-AS 150, as illustrated at step 414. The data update can include the MSISDN-TCBNUM match data. At step 416, the ECB-AS 150 can return an acknowledgement (ACK) to the GMLC 129 to acknowledge receipt of the data update.

At step 418, the emergency call is unexpectedly released thereby triggering a callback scenario. Multiple ESPOSREQ's can be sent from the PSAP 123 to the GMLC 129 prior to the unexpected release. In response to the call being released, the GMLC 129 can send a data update including a termination notice to the ECB-AS 150, at step 420. At step 422, the ECB-AS 150 can return an ACK to the GMLC 129 to acknowledge receipt of the termination notice. Also in response to the call being released, the PSAP 123 can initiate an emergency callback to the emergency caller using the TCBNUM, at step 424. The PSAP 123 can direct the call to the IMS network 144 by way of a callback gateway, such as the MGCF 154, for example. The emergency callback can include a CdPN field populated with the TCBNUM, a CgPN field populated with the PSAP 123 number, and a CPC field populated with any CPC data.

The IMS network 144 can process the call by determining the call is an emergency callback without regard to the value in the CPC field. At step 426, the IMS network 144 can send a special session initiation protocol (SIP) invite message to the ECB-AS 150. In response to receiving the SIP invite, the ECB-AS 150 can begin to control the recombination of the call to the true CdPN or B-pty. At step 428, the ECB-AS 150 can create a special SRI message that is directed to the HLR 117 or the HSS 152 (not shown) with one or more protective parameters needed to eliminate call blocking features and to initiate normal PRN procedures. The SRI message can set parameters to override any restrictions the HLR 117 might impose on the callback. At step 430, normal PRN procedures are executed and an MSRN can be returned for final routing. If the query was made on an inbound roaming subscriber, the HLR 117 can return an error, for example, unitdata service (UDTS) message "no translation found" or unitdata (UDI) message "unknownSubscriber." If the HLR 117 issues such an error, the ECB-AS 150 can use the MSISDN it received in step 414 to formulate the outgoing call leg. At step 432, the HLR 117 can acknowledge the special SRI message and return the MSRN to the ECB-AS 150 for processing. At step 434, the ECB-AS 150 can send an invite to the IMS network 144. The invite can include the MSRN in the to field, and the PSAP number in the Fmm field tagged as Emergency. In response, at step 436, the IMS network 144 can send the call using the MSRN digits or the original MSISDN, along with the original or created CgPN and CPC data to the MSC 114. The call is connected to the original calling party without restrictions based upon the SRI override procedure. If the HLR 117 cannot find the customer, then the call is sent to the actual MSISDN via normal network routing. If no MSISDN match ever existed, then an error procedure can be followed at the operator's discretion. If a call forwarding not reachable (CF-NRch) condition is returned, then the call forward if not reachable (CF-NRch) value should be used instead of the MSISDN.

In some embodiments, a roaming subscriber may erroneously be assigned a TCBNUM that cannot be completely eliminated. In these embodiments, the controlling network (e.g., the IMS network) can send the call to the serving network (e.g., the visiting PLMN) with a CPC parameter equal to ESC or equivalent. If the serving network receives this CPC value, the serving network can use the atypical CPC value to handle the call differently so as to ensure call blockers are eliminated. In the case where this occurs over a single operator's network, the operator can send the CPC value to the end serving MSC. This case can be considered a backup solution, since the special SRI message should have eliminated any blockers.

Figure 5:
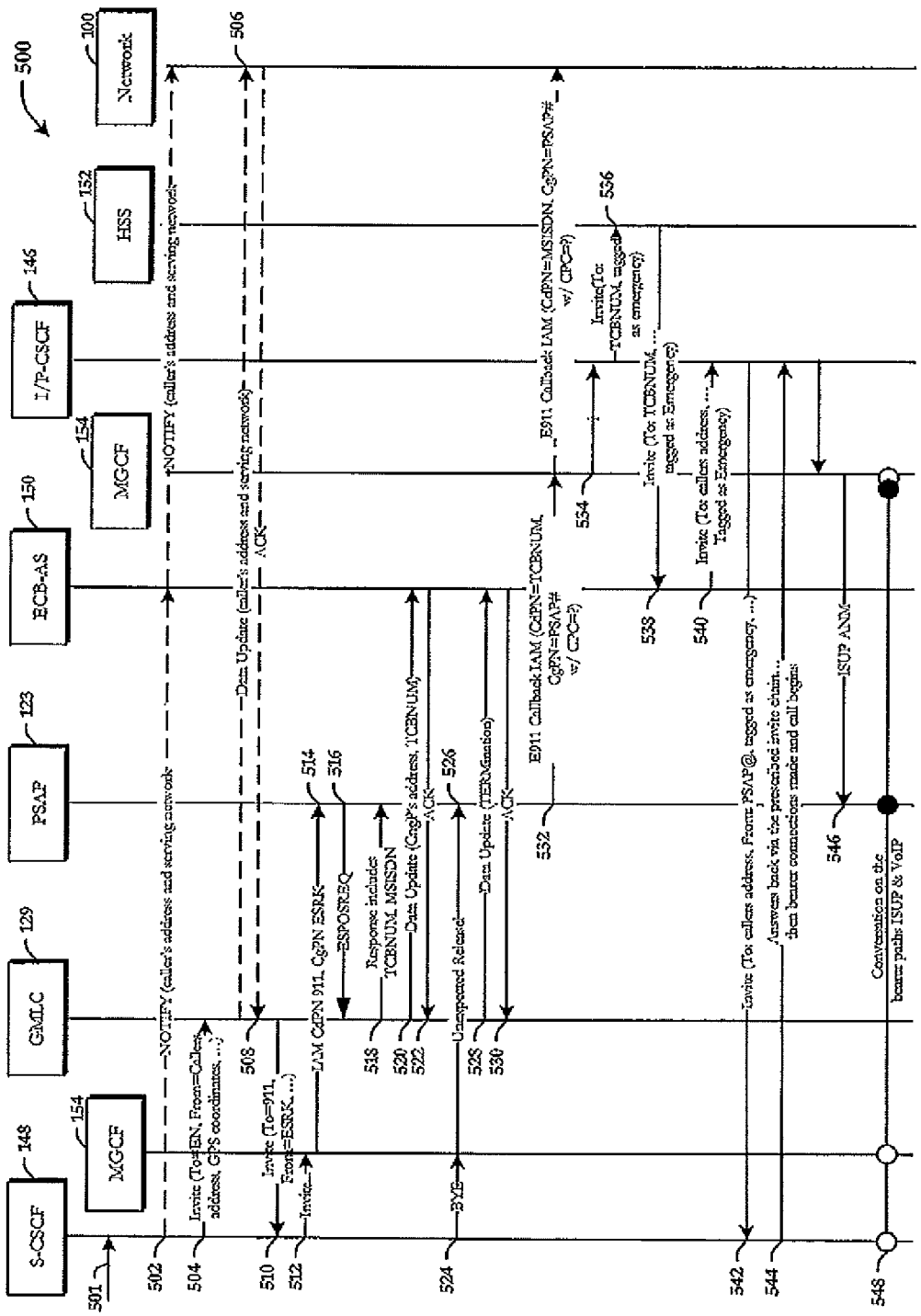
FIG. 5 illustrates an exemplary message flow diagram of an emergency callback procedure, according to another embodiment of the subject disclosure.

Referring now to FIG. 5, a message flow diagram illustrates an emergency callback procedure 500, according to another exemplary embodiment of the subject disclosure. The illustrated message flow diagram 500 includes the S-CSCF 148, the MGCF 154, the GMLC 129, the PSAP 123, the ECB-AS 150, the HSS 152, and the communications network 100.

The emergency callback procedure 500 begins at step 501 when an IMS-registered mobile device such as, for example, MSs 102, 104 and UEs 136, 138 initiates an emergency services call (e.g., by dialing 9-1-1). Per the operator's configuration, at step 502, the MSs, UEs or the S-CSCF 148 can detect that the call is an emergency call and send an SIP notify message, including the calling party's address and serving network, to the ECB-AS 150 to warn the ECB-AS 150 that an emergency call was just made triggering various logic actions, such as, for example, pulling subscriber provisioning information from various databases. This SIP Notify message can also be sent to the home network (e.g., the network 100) should the home network be configured to receive and process the message. That is, for example, the home network includes an IMS solution to process a SIP Notify message and other informational messages on behalf of network users. This step can allow the ECB-AS 150 and a home network system to become aware of all the services and features on the account and which of those features are potential callback blockers that should be circumvented. The ECB-AS 150 can redirect or proxy the message to the home network for the serving network.

At step 504, the S-CSCF 148 can generate and send a SIP invite message to the GMLC 129. It is noted that the mobile device can be any valid mobile device, a mobile device with disconnected service (i.e., only available for emergency calls), or a mobile device without a SIM card. The illustrated SIP invite message includes a from field that includes the calling party's address (e.g., MSISDN@dns), a to field that includes the emergency address (e.g., 9-1-1 or translated address), and a network identifier to identify the network from which the call is incoming. In some embodiments, GPS coordinates for the calling patty's current location can be sent in the SIP invite message eliminating the need for the GMLC 129 to make the initial location query.

At step 506, the home public land mobile network (HPLMN), such as the illustrated network 100, is alerted to the fact that their roaming customer made an emergency call in the serving carrier's network. The alert can be a data update that includes the calling party's address and the serving network. This allows the HPLMN carrier to take action as desired or configured, such as, for example, pulling subscriber provisioning information from various databases. This would allow the HPLMN systems to become aware of all the services and features on the account and which features are potential callback blockers that should be circumvented. This may be an entirely optional action if the message, in step 502, is extended to the home network. In this case, this step would be a duplication to step 502. At step 508, the network 100 acknowledges the data update in an ACK message. At step 510, the GMLC acknowledges the invite and sends the emergency number in the to field and the ESRK in the from field.

At step 512, the S-CSCF 148 sends a SIP invite to the MGCF 154. At step 514, the MGCF 154 and the S-CSCF 148 routes the emergency call to the PSAP 123 identified by the ESRK (ESNE/ESME) through the ILEC selective router (not shown). If the PSAP 123 supports CAMA (a single set of 7/10 digits), then a temporary ESRK (one of 10K unique values per cell site) can be assigned for routing. If the PSAP 123 supports MF or ISUP, then the ESRD and callback number can be returned for routing. By default, however, the call can be routed to the PSAP 123 in accordance with current industry standards.

After the call is received at the PSAP 123, the PSAP 123 interrogates the GMLC 129 for location and callback information using an ESPOSREQ, at step 516. At step 518, the GMLC 129 returns the location and callback information, including a TCBNUM, instead of the actual MSISDN. It is noted that a calling party without service or an assigned MSISDN may not obtain a TCBNUM. Also, roaming subscribers may not obtain a TCBNUM. The GMLC 129 can maintain the correlation between the subscriber's actual MSISDN and the TCBNUM in its database for any period of time, for example, as defined by the network operator. Additionally, the GMLC 129 can discriminate any MSISDN digit or the lack thereof in this decision making process. By way of example, the GMLC 129 may not be able to send the TCB-NUM if there is no CgPN available, such as if the initiating mobile device does not have a SIM card inserted or the mobile device is deregistered with no MSISDN (or equivalent number) available. It should be understood that the actual MSISDN can be sent in this response to the PSAP 123 for use in backup routing and for other purposes, such as tracking, for example.

The response in step 518 can trigger a data update, at step 520, from the GMLC 129 to the ECB-AS 150 with the MSISDN-TCBNUM match data. The ECB-AS 150 can return an acknowledgement message at step 522.

At step 524, the mobile device drops the call and the S-CSCF 148 notifies the MGCF 154 of the dropped call. At step 526, the emergency call is unexpectedly released thereby triggering a callback scenario. In response to the call being released, the GMLC 129 can send a data update including a termination notice to the ECB-AS 150, at step 528. At step 530, the ECB-AS 150 can return an ACK to the GMLC 129 to acknowledge receipt of the termination notice. Also in response to the call being released, the PSAP 123 can initiate an emergency callback IAM message to the MGCF 154, at step 532. The IAM message can include a CdPN set to the TCBNUM, a CgPN set to the PSAP number with CPC set to any value, although this is not necessarily the case. If no TCBNUM was allocated, the callback can be to the customer's MSISDN via the customer's HPLMN. The MGCF 154 can forward the IAM message to the I/P-CSCF 146 for forwarding to the network 100.

At step 534, the MGCF 154 and the I/P-CSCF 146 (particularly the I-CSCF) processes the call in an atypical fashion. The MGCF 154/I-CSCF 146 can first determine that the call is an emergency callback regardless of the received CPC value by recognizing the TCBNUM and then can send a special SIP invite message to the HSS 152, at step 536. At step 538, the HSS 152 determines that the call is an emergency call and directs the special SIP invite to the ECB-AS 150. All interfering services are bypassed and the emergency service initial filter criteria (IFC) becomes the only service executed. The emergency service can send out multiple and simultaneous data messages to multiple nodes/systems when executed. For example, a SIP notify can be sent out to another out-of-band or non-real-time notification service, such as a service that allows a parent who wants to know a child has an emergency but does not interfere with the primary PSAP callback.

At step 540, the ECB-AS 150 substitutes the TCBNUM address with the emergency calling party's real address for final delivery. The ECB-AS 150 then forwards the invite to the I/P-CSCF 146. The invite can include the to field with the calling party's address. At step 542, a final invite is delivered from the I/P-CSCF 146 to the S-CSCF 148. The S-CSCF 148 answers back via the prescribed invite chains, bearer connections are established, and the call begins, at step 544. At step 546, the ECB-AS 150 passes an ISUP-ANM to the PSAP 123. At step 548, the bearer paths are opened to facilitate voice communications and re-establish the emergency call.

Figure 6:
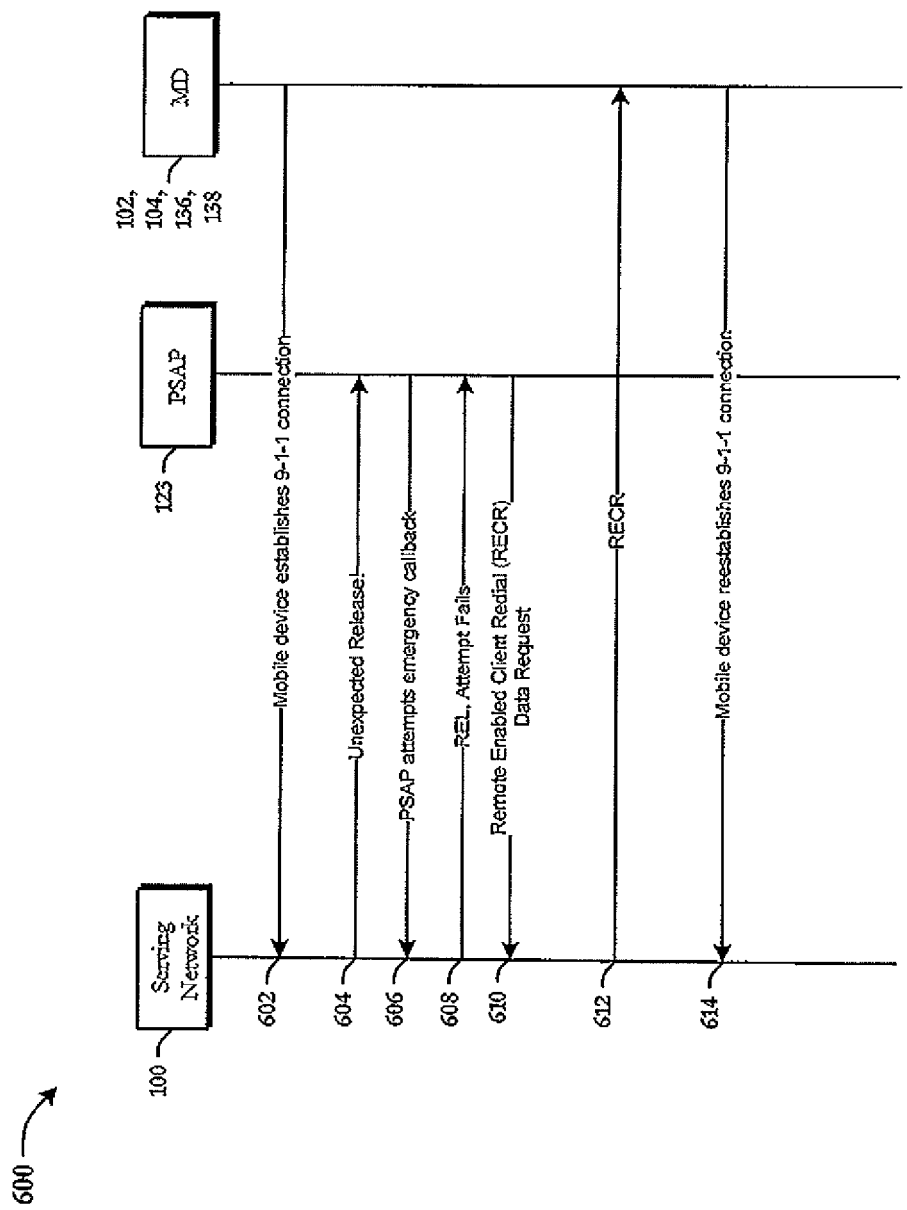
FIG. 6 illustrates an exemplary message flow diagram of an emergency callback procedure, according to another embodiment of the subject disclosure.

Referring now to FIG. 6, a message flow diagram illustrates an emergency callback procedure 600, according to another exemplary embodiment of the subject disclosure. The illustrated message flow diagram includes a serving network, such as the communications network 100, the PSAP 123, and a mobile device (MD), such as MSs 102, 104 and UEs 136, 138.

The emergency callback procedure 600 begins at step 602, wherein a registered MD initiates an emergency services 9-1-1 call via normal procedures in the serving network. Additionally, the MD can wake-up a Remote Enabled Client Redial (RECR) client that is stored in a memory of the MD to monitor incoming messages for a specified time period. Optionally, per the operator's configuration and the technology of the MD, the RECR client can communicate with a host server to reserve a connection path back to the MD. This can allow queries to come back to the MD when applicable. This requires technologies that are capable of handling packet data streams and voice calling simultaneously, such as UMTS and equivalents, for example.

At step 604, the emergency call is dropped and the calling party can no longer communicate with the PSAP 123 operator. The RECR client, activated in the previous step, can recognize that the call was dropped and store information about the dropped call, such as, the release cause codes, for example. This information can be used to further refine the RECR client's reactions to incoming messages, such as adjusting the monitoring for RECR messages an active state as opposed to a background state, thereby advancing the priority of RECR messages on the MD.

At step 606, the PSAP 123 attempts an emergency callback but is unsuccessful. The PSAP 123 can attempt an emergency callback multiple times unsuccessfully. At step 608, the emergency calling party or the serving network releases the call. The call release can be caused by voluntary or involuntary action by either end party.

At step 610, the PSAP 123 can use predefined rules and procedures to initiate an RECR to force the emergency caller to re-initiate an emergency call. The RECR message can extend to the MD, where the RECR client can receive and act on the incoming message. Preferably, in some embodiments, the PSAP 123 initiates a callback using the calling party's MSISDN or a temporary routing number. As discussed above in step 602, however, it will be possible to send messages to the MD using a reserved connection path. Again, this is only applicable in certain conditions. The primary condition being that the MD and the serving network can communicate simultaneously as a 9-1-1 voice call progresses. The RECR message can utilize multiple protocols and methods, such as USSD-Notify, SMTP, SMPP, and IMS-SIP, for example. The message can contain routing information, such as a telephone number and other pertinent and usable addresses. The message can request various multimedia sessions, like a request to invoke a camera or voice recorder, for example.

At step 612, the serving network receives the message and sends it to the MD/RECR client. Based upon predefined rules, the RECR client can request the MD to make the prescribed emergency call and/or data event on behalf of the emergency caller. The emergency caller can retain on demand control of the call and can drop control at anytime the call is being made (under the direction of the RECR client).

At step 614, the MD makes an emergency callback to the PSAP 123, which orders the RECR operation using the routable addresses from the initial RECR message. The routable address can be a normal telephone number or the 9-1-1 digits. The response can be a data message if the PSAP 123 operator chooses that option.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
processing, by a gateway mobile switching center, an emergency callback, received in response to an unexpected release of an established emergency call between a safety answering point and a mobile device, to reestablish communication between the safety answering point and the mobile device;
issuing, by the gateway mobile switching center, a special use send routing information message to a home location register, the special use send routing information message comprising a call-blocking parameter to suppress call-blocking features enabled for a calling party of the established emergency call, the call-blocking features comprising a call restriction service, a bar all incoming calls service, and an anonymous call rejection service;
processing, by the gateway mobile switching center, a special use send routing information acknowledgement message received by the gateway mobile switching center from the home location register in response to the special use send routing information message comprising the call-blocking parameter, the special use send routing information acknowledgement message comprising a mobile station roaming number obtained from a mobile switching center; and
routing, by the gateway mobile switching center, the emergency callback to the mobile device based upon the mobile station roaming number included in the special use send routing information acknowledgement message received from the home location register.

2. The method of claim 1, wherein the emergency callback comprises a calling party number, set to a number for the safety answering point, and a calling party category value.

3. The method of claim 1, wherein the emergency callback comprises a called party number set to a temporary routing number.

4. The method of claim 3, further comprising:
transmitting, by the gateway mobile switching center, a request to an emergency callback platform for a mobile subscriber integrated services digital network number that matches the temporary routing number; and
receiving, by the gateway mobile switching center, a response from the emergency callback platform, the response comprising the mobile subscriber integrated services digital network number and a calling party category set to an emergency service call.

5. The method of claim 1, wherein the call-blocking parameter is configured to suppress the call restriction service.

6. The method of claim 5, wherein the call restriction service comprises a call forwarding service.

7. The method of claim 5, wherein the call restriction service comprises the bar all incoming calls service.

8. The method of claim 5, wherein the call restriction service comprises the anonymous call rejection service.

9. The method of claim 5, wherein the call restriction service comprises an intelligent network service.

10. The method of claim 5, wherein the call restriction service comprises a proprietary service.

11. A gateway mobile switching center, comprising:
a processor; and
a memory having stored thereon instructions that, when executed by the processor, cause the processor to perform operations comprising:
processing an emergency callback received from a safety answering point in response to an unexpected release of an emergency call;
issuing a special use sending routing information message to a home location register, the special use sending routing information message comprising a call-blocking parameter to suppress call-blocking features enabled for an emergency calling party, the call-blocking features comprising a call restriction service, a bar all incoming calls service, and an anonymous call rejection service;
processing a special use send routing information acknowledgement message received by the gateway mobile switching center from the home location register in response to the special use send routing information message comprising the call-blocking parameter, the special use send routing information acknowledgement message comprising a mobile station roaming number; and
routing the emergency callback to a mobile device based upon the mobile station roaming number included in the special use send routing information acknowledgement message received from the home location register.

12. The gateway mobile switching center of claim 11, wherein the emergency callback comprises a calling party number, set to a number for a safety answering point, and a calling party category value.

13. The gateway mobile switching center of claim 11, wherein the emergency callback comprises a called party number set to a temporary routing number.

14. The gateway mobile switching center of claim 13, wherein the instructions further cause processor to perform operations comprising:
transmitting, to an emergency callback platform, a request for a mobile subscriber integrated services digital network number that matches the temporary routing number; and
receiving, from the emergency callback platform, a response comprising the mobile subscriber integrated services digital network number and a calling party category set to emergency service call.

15. The gateway mobile switching center of claim 11, wherein the call-blocking parameter is configured to suppress the call restriction service.

16. The gateway mobile switching center of claim 15, wherein the call restriction service comprises a call forwarding service.

17. The gateway mobile switching center of claim 15, wherein the call restriction service comprises the bar all incoming calls service.

18. The gateway mobile switching center of claim 15, wherein the call restriction service comprises the anonymous call rejection service.

* * * * *